United States Patent Office 3,512,816
Patented May 19, 1970

---

3,512,816
MEANS FOR CONNECTING FRONT AND REAR PORTIONS OF A FOLDABLE BICYCLE
Jiro Katano, Nagoya, Japan, assignor to Katano Jitensha Kabushiki Kaisha, Nagoya, Japan, a corporation of Japan
Filed Mar. 18, 1968, Ser. No. 713,784
Claims priority, application Japan, Sept. 6, 1967, 42/76,290
Int. Cl. B25g 3/38
U.S. Cl. 287—99                         1 Claim

ABSTRACT OF THE DISCLOSURE

Means for connecting the front and rear portions of a foldable bicycle, which is capable of preventing relative twisting movement of the two portions. The connecting means comprises a hinge shaft, a pair of similarly shaped non-planar hinge plate members, one of the hinge plate members being adapted to be symmetrical with respect to the hinge shaft when the bicycle is folded, and fastening means to hold the two hinge plate members in tight contact.

---

This invention relates to means for connecting the front and rear portions of a foldable bicycle.

Generally speaking, a known foldable bicycle has a hinge or the like to securely connect the front and rear portions thereof, any twisting stress acting between which directly results in a severe strain on such hinge. The connecting hinge of such a bicycle is usually arranged vertically, so that two straps screwed to the front and rear portions, respectively, can rotate around a shaft disposed vertically. When the two straps of the hinge are opened and placed in a vertical plane to keep the bicycle in an operative condition or position, the aforesaid twisting stress is borne only by screws fastening the straps to the bicycle bodies and the shaft of the hinge. Accordingly, the mechanical strength opposing such twisting stress is determined by the fastening screw and the shaft, and not by the strength of the straps. With such a conventional structure of the hinge, it is difficult to provide high strength against twisting stress.

To overcome such difficulty, it has been proposed, for instance, to let a suitable pipe member of the bicycle body extend through both straps of such hinge when they are spread on a plane, by forming special holes in the straps. The special holes and modifications of the pipe member cooperating with such special holes, however, result in a very complicated structure of the bicycle, and hence such proposal inevitably leads to a considerably high cost of manufacture.

Therefore, an object of the present invention is to provide means for connecting the front and rear portions of the foldable or collapsible bicycle, which is completely free from the aforementioned difficulties.

The connecting means according to the present invention comprises a pair of bent hinge members, which are symmetrical with respect to an axis of the hinge when one of the hinge members rotates by 180 degrees to open the connecting means. The pair of hinge members are respectively welded to the front and rear portions of the foldable bicycle, and when the bicycle is folded, the connecting means is held open, while upon unfolding the bicycle, the connecting means is closed to bring the bent hinge members into tight planar contact with each other. The two bent hinge members kept in such planar contact provide a high mechanical strength resisting the twisting stress between the front and the rear portions of the bicycle.

Other objects and a fuller understanding of the invention may be had by referring to the following description, taken in conjunction with the accompanying drawings, in which.

Like parts are designated by like numerals and symbols throughout the drawings.

Figure 1:
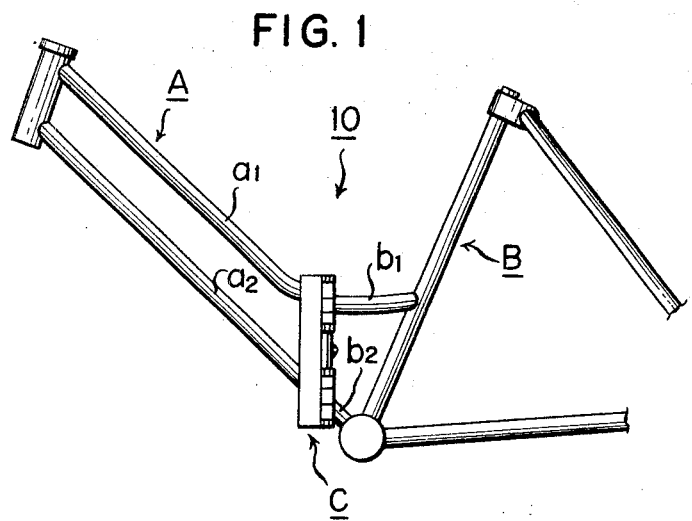
FIG. 1 is a diagrammatic illustration of connecting means according to the present invention as mounted on a foldable bicycle for women.
Figure 2:
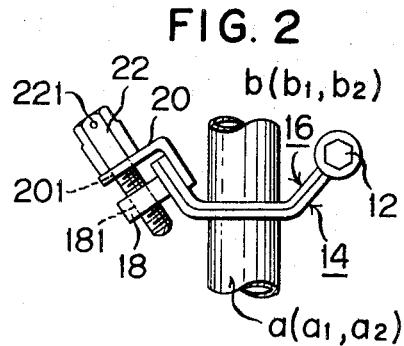
FIG. 2 is an enlarged schematic view of the connecting means shown in the closed position.
Figure 3:
FIG. 3 is an enlarged schematic view of the connecting means shown in the opened position.
Figure 4:
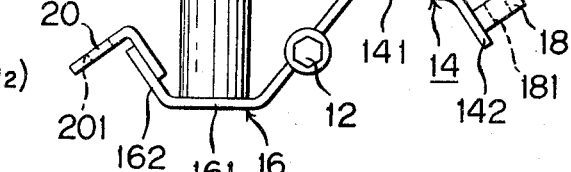
FIG. 4 is a front view of the connecting means shown in similar position.

Referring to FIG. 1, the foldable bicycle body, generally depicted by a reference numeral 10, comprises a front portion A and a rear portion B (or body), which are rotatably connected together by connecting means C according to the present invention. As clearly shown in FIG. 4, the connecting means have a pair of hinge members 14 and 16 to rotate relative to each other around a shaft or axis 12. In the embodiment, as depicted in FIGS. 2, 3, and 4, the hinge member 14 has substantially the same cross sectional shape as that of the cooperating hinge member 16, each comprising a flat portion 141 (or 161), and at least one bent portion 142 (or 162). The flat portion 141 of the one hinge member 14 is welded to pipes $a_1$ and $a_2$ of the front portion A, while the flat portion 161 of the other hinge member 16 is welded to pipes $b_1$ and $b_2$ of the rear portion B, so that when the hinge member 14 rotates around the shaft 12 and comes into engagement with the other hinge member 16 to unfold the bicycle, the flat portions of the hinge members are kept in tight planar contact.

Referring to FIGS. 2 and 3, a tapped projection 18 is secured at the back of the bent portion 142 by suitable means, e.g. welding, while a trapped L-shaped lug 20 is secured on the inner surface of the bent portion 162 with similar securing means. When the hinge member 14 is turned around the shaft 12 to bring it into contact with the other hinge member 16, a bolt 22 is screwed into the tapped holes 181 and 201 of the projection and the L-shaped lug 20 to fasten the two hinge members in a planar contact, as shown in FIG. 2. In the illustrated example, a plurality of holes 221 are formed on the head of the bolt 22 to facilitate the tightening of the bolt with a simple means, such as a nail or an iron peg, without requiring any elaborate tools. It is also possible to mount a pair of butterfly-like lugs (not shown) on the bolt head to provide for manual tightening of the bolt 22. According to the present invention, it is also permissible to make either or both of the holes 181 and 201 in the form of untapped plain through holes, so that the projection 18 and the L-shaped lug 20 can be fastened together by using a bolt and nut (not shown).

Figure 5:
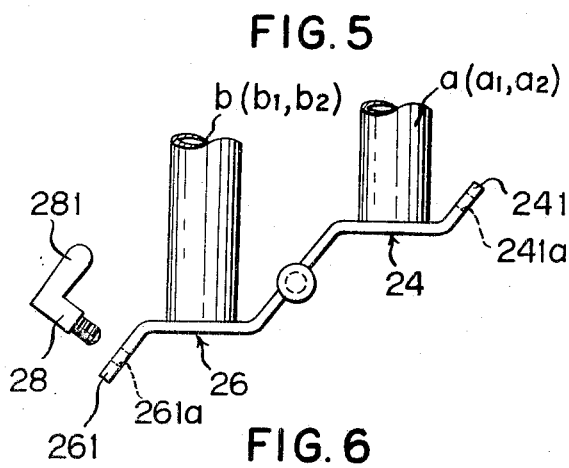
FIG. 5 is a view similar to FIG. 3, showing a different embodiment of the invention.

FIG. 5 shows another embodiment of connecting means according to the present invention, in which both hinge members 24 and 26 are of an identical step-like shape. As shown in FIG. 5, bent portions 241 and 261 of the respective hinge member have one or more holes 241a and 261a, respectively, bored therethrough. The hole 241a is tapped, so that the two hinge members 24 and 26 can be fastened together by means of a bolt 28 having a lug 281. It is, of course, possible to tap the hole 261a too, in conjunction with the hole 241a, for fastening the two hinge members.

Figure 6:
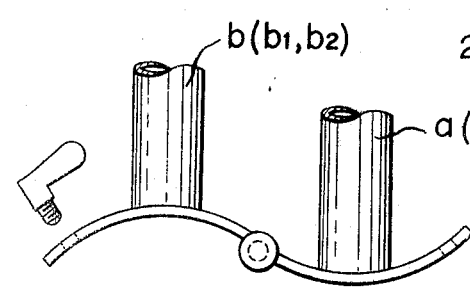
FIG. 6 is a view similar to FIG. 3, illustrating another embodiment of the present invention.

FIG. 6 illustrates another connecting means embodying the present invention, which comprises a pair of arcuate hinge members, which are identical in the shape. Each hinge member has a hole to facilitate fastening of the two hinge members 34 and 36 together by a bolt, in the same manner as the embodiment described above referring to FIG. 5.

In the bicycle body 10, as shown in FIG. 1, the two upper tubes $a_1$ and $b_1$ are disposed close to the other two tube members $a_2$ and $b_2$, and the tube $a_1$ is slightly bent. Such disposition of the tubes, which is specially adapted for use by women, makes it possible to make the connecting means C compact. According to the present inventtion, to connecting means, of course, can be applied to other type of foldable bicycles. For instance, the connecting means C can be successfully adapted to a foldable bicycle having upper tubular member $a_1$ and $b_1$ extending substantially horizontally from a head tube of the bicycle toward the rear portion B, while the lower tubular members $a_2$ and $b_2$ are slanted, as in the case of most commonly used bicycles. With the foldable bicycles having horizontally extending upper tubular members, the vertical length of the connecting means C according to the present invention is longer than that illustrated in FIG. 1, but the remainder of the connecting means are the same as illustrated, and it can be used as effectively as the illustrated ones.

As described in the foregoing, according to the present invention, there is provided a connecting means C for connecting the front and rear portions of the foldable bicycle in a very stable manner by using a pair of bent or arcuate hinge members to be fastened together to formulate a tight planar contact. Thus, the twisting force acting between the front and rear portions, such as a shearing force caused by different loading on the two portions due to the irregularity of road surface conditions, can be borne safely by the bent or arcuate planar contact of the connecting means C, even though such twisting force is borne only by the shaft and screws in the case of the conventional connector. In known connectors, the hinge members or straps slide on each other by such twisting force, and the contact surface of the straps does not bear the twisting force. On the other hand, the bent or arcuate contact surface of the hinge members according to the present invention is kept intact even after such twisting force is applied thereto, and the twisting force is borne by the bent or arcuate contact surface.

Moreover, with the special structure of the connecting means according to the present invention, the front and rear portions of the folding bicycle can be easily assembled together by a simple manual operation of tightening one or two bolts. Since the hinge members are so spaced as to form a non-plain or non-flat contact surface when they are brought into tight contact, they do not slide on each other along the contact surface, as in the case of plain flat straps. Thus, the connecting means according to the present invention is very stable. Such stable operation of the connecting means provides improved durability thereof. Accordingly, the connecting means of the present invention is economical in the long run. Furthermore, with the stable and tight connection between the front and rear portions, achieved by the connecting means of the invention, the comfort of the rider is considerably improved too.

Thus, the present invention contributes greatly to the art of foldable bicycles.

Although the present invention has been described with a certain degree of particularity, it is understood that the present disclosure has been made only by way of example and that numerous modifications in the details of construction and the combination and arrangement of parts may be resorted to without departing from the spirit and the scope of the invention.

What I claim is:

1. Means for connecting front and rear portions of a foldable bicycle, comprising a hinge shaft, a pair of hinge plate members of bent shape pivotally joined at one end by said hinge shaft, said bent hinge plate members being symmetrical with each other in respect of said hinge shaft when said hinge plate members are opened by turning one of said hinge plate members around the hinge shaft from a position where said one hinge plate member is in tight contact with the other hinge plate member to form an angulated planar contact surface, each hinge plate including two planar end portions each of which is respectively inclined relative to a central planar portion of the hinge plate, said planar end portions of each respective hinge plate being parallel to one another and a fastening means to hold the two hinge plate members in tight contact at respective end portions thereof.

References Cited

UNITED STATES PATENTS

| 437,936 | 10/1890 | O'Brien | 182—24 XR |
|---|---|---|---|
| 646,347 | 3/1900 | Betty | 182—24 |
| 1,479,628 | 1/1924 | Seger | 287—96 XR |
| 3,294,416 | 12/1966 | Carnielli | 287—99 XR |

FOREIGN PATENTS 6,718  3/1899  Great Britain.

DAVID J. WILLIAMOWSKY, Primary Examiner

A. V. KUNDRAT, Assistant Examiner

U.S. Cl. X.R.

280—278